United States Patent [19]
Neal

[11] 3,803,748
[45] Apr. 16, 1974

[54] SPRING-LOADED DOUBLE-ACTING FISHHOOK

[75] Inventor: Julian E. Neal, Mansfield, La.

[73] Assignee: Fred Mitchell, Robeline, La. ; a part interest

[22] Filed: Mar. 9, 1973

[21] Appl. No.: 339,948

[52] U.S. Cl. ................................................. 43/36
[51] Int. Cl. ............................................ A01k 83/02
[58] Field of Search ................ 43/36, 37, 43.2, 43.4

[56] References Cited
UNITED STATES PATENTS

| | | | |
|---|---|---|---|
| 649,510 | 5/1900 | Fredricks | 43/36 |
| 1,322,365 | 11/1919 | Sobanski | 43/37 |
| 1,056,397 | 3/1913 | Bonnell | 43/36 |
| 2,120,863 | 6/1938 | Johnson | 43/37 |

Primary Examiner—Warner H. Camp
Attorney, Agent, or Firm—Clarence A. O'Brien; Harvey B. Jacobson

[57] ABSTRACT

A spring-loaded double-acting fishhook characterized by companion main and auxiliary fishhook units. The median portion of the shank of the main unit is provided with a lateral bend defining a journal. The coordinating median portion of the auxiliary unit has aligned coils providing a bearing for the journal whereby to assemble and pivotally join the two units. A V-spring has aligned spring coils encircling the first-named coils, and legs diverging therefrom and provided with terminal eyes which surround and are joined to oriented shank portions of the units in a manner to close the barb-equipped hooks in compactly nestled weedless relationship. These hooks spring open and trap the fish when a proper tug on the line is initiated by the fish.

4 Claims, 5 Drawing Figures

PATENTED APR 16 1974　　3,803,748

SPRING-LOADED DOUBLE-ACTING FISHHOOK

This invention relates to a double-acting spring-loaded fishhook characterized, generally stated, by companion main and auxiliary fishhook units having median portions of their shank portions coordinated and pivotally joined together and has to do, more particularly, with an innovation wherein the barbed end portions are spring-biased so that they are compactly nestled together when in their normally set closed position, whereby to render the overall fishhook substantially weedless but readied to open when the attached fishing line is forcibly pulled.

More specifically, the median shank portions of the main and auxiliary units are structurally united and pivotally assembled in a unique manner and a V-spring is novelly mounted and serves to set the units in closed relationship but in readiness to spring to an open position when the fishing line is timely and controllably actuated.

Spring-loaded and double-acting fishhook constructions are of many and varied types and forms. Despite the efforts of others working in the field of endeavor under consideration double-acting fishhooks appear not to have met with widespread adoption and use because of the fact that prior art adaptations are known to hang on limbs and similar obstacles and do not well serve the purposes for which they have been devised and offered for use. A principal object of the present invention is to provide pivoted spring-loaded hook units which function to maintain the barbed hooks in nestled and close coacting relationship when normally closed whereby to thus provide a weedless satisfactorily manageable fishhook construction.

For background purposes attention is invited to a fishhook of a simple tongs type disclosed in U.S. Pat. No. 503,864, granted to David Lehmann. It will be noted in this connection that the hooks are spread apart, undesirably, before being lowered into the water in the manner shown. Dual spring-biased straight-shank pivoted hooks utilizing rigid link means between the eye-equipped ends is revealed in U.S. Pat. No. 649,510, granted to C. Fredricks. Additional information indicative of the state of the art to which the invention relates can be had when reference is made to the fishhook disclosed in U.S. Pat. No. 1,322,365, granted to Antoni Sobanski.

A significant object of the present invention, broadly stated, is to structurally, functionally and in other ways improve upon the pivoted prior art fish trapping hooks.

Briefly the improved fishhok construction herein disclosed comprises a main fishhok unit embodying a first shank portion terminating in a barb-equipped hook, a second complemental offset portion terminating in a line-accommodating eye and a median laterally bent offset portion constituting a journal. An auxiliary fishhook unit is complemental to the main unit and it embodies a relatively short shank portion having a barbed hook at one end, and a second shank portion having a line attaching eye and a coordinating intermediate portion having aligned coils operatively surrounding and supported by the journal. These coils provide a bearing for the journal and also function to pivotally mount the auxiliary hook unit on the main hook unit. A pull responsive spring is oriented with and normally retracts and compactly nestles the barbed hooks in set close-together weedless relationship. A fishing line has one end tied to the second eye and slidingly threaded through the first-named eye and functions when active to actuate the respective shank portions to a position spreading and opening the normally closed fish trapping barbs.

These together with other objects and advantages which will become subsequently apparent reside in the details of construction and operation as more fully hereinafter described and claimed, reference being had to the accompanying drawings forming a part hereof, wherein like numerals refer to like parts throughout.

Figure 1:
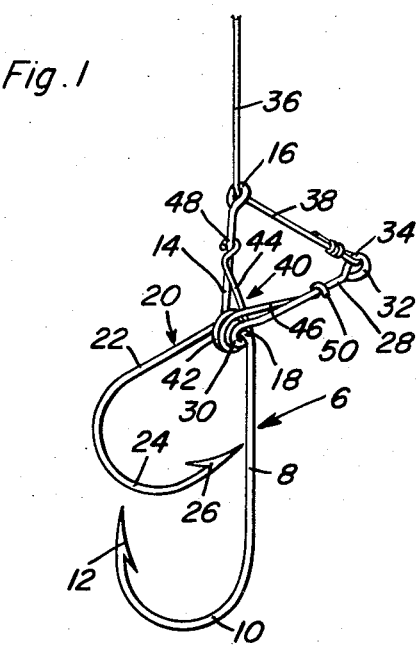
FIG. 1 is a view in perspective of a spring-loaded double-acting fishhook construction constructed in accordance with the principles of the present invention and showing the barbed hooks in close-together set position.
Figure 2:
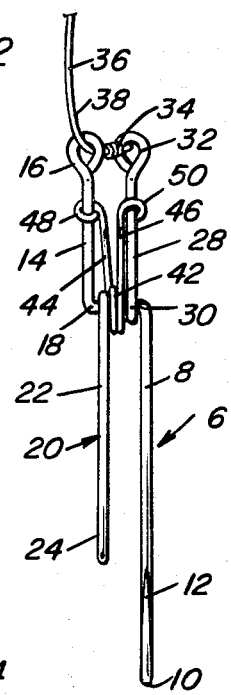
FIG. 2 is a view observing FIG. 1 in a direction from left to right.

The relatively long main fishhook unit is denoted by the numeral 6 and embodies a first shank portion 8 having a curvate return bend 10 terminating in a barbed or pointed hook 12. A second complemental offset portion of the shank is denoted at 14 and terminates in a line accommodating eye 16. A median laterally bent off-setting portion constitutes a journal and is denoted at 18. The auxiliary relatively short or smaller fishhook unit is denoted by the numeral 20 and embodies a first straight shank portion 22 having a return bend 24 terminating in a barbed fishhook 26. The second shank portion is denoted at 28 and the intervening or intermediate portion is provided with aligned coils 30 operatively surrounding and supported by the journal 18. The line attaching eye at the end of the shank portion 28 is denoted by the numeral 32. An end portion 34 of the line 36 is tied to the eye 32 and the adjacent portion 38 is slidingly passed through the aforementioned line accommodating eye 16 to achieve the opening and closing results brought out in the views of the drawing. The pull responsive spring means is denoted by the numeral 40 and comprises a V-spring the vertex portion of which is provided with coils 42 surrounding the aforementioned coils 30. The diverging limbs or legs 44 and 46 are nested between the shank portions 14 and 28 and terminal eyes 48 and 50 are connected with and anchored on the shank portions 14 and 28 in the manner shown.

Figure 3:
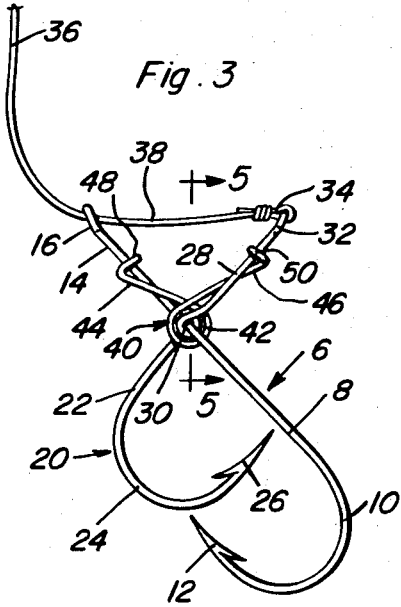
FIG. 3 is a view of the same drawn in side elevation and serving to show the details of construction with greater particularity.
Figure 4:
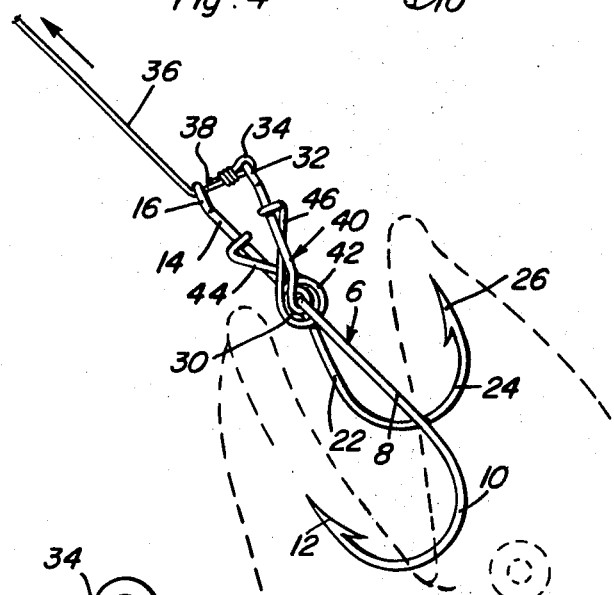
FIG. 4 is a view based on FIG. 3, for example, but showing the line being pulled and also showing the barbed hooks spread apart to make the catch.

It will be evident in particular from FIGS. 1 and 3 how the component main and auxiliary units 6 and 20 are individually constructed and conjointly assembled for proper open and closed relationship. More specifically these two views emphasize the spread-apart construction of the shank portions 14 and 28 (left and right in FIG. 3) wherein it will be observed that these shank portions are at approximate right angles to each other in the normal closed position of the units. It will also be noted that the overall shank of the auxiliary unit 20 assumes an approximate position at right angles to the overall shank of the primary or main unit 6. With the units in this position and relationship the barbed end portions 12 and 26 are in compact and nestled relationship whereby to thus provide the desired weedless result. FIG. 4 shows how when a pull on the line is exerted, the hook-equipped units spread apart to open position, this being the position shown for setting the hooks and trapping the fish.

Figure 5:
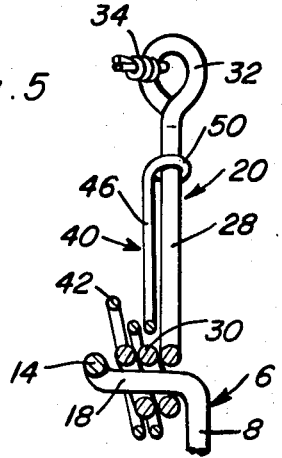
FIG. 5 is an enlarged view in elevation and section taken approximately on the plane of the section line 5—5 of FIG. 3 looking in the direction of the indicating arrows.

The features of construction are brought out with particularity in FIG. 5 wherein it will be evident that the first mentioned coils 30 surround the bent portion 18 in a manner to provide both the bearing and the journal feature as well as the assembling and pivotal result. This view also emphasizes the spring coils 42 at the crotch or vertex portion of the V-spring 40. It is believed, therefore, that a studied consideration of the views singly and conjointly will enable the reader to obtain a clear and comprehensive understanding of the construction of the units and the manner in which they are assembled, pivoted and function to achieve the desired opening and closing result.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A spring-loaded double-acting weedless type fishhook comprising a relatively long main fishhook unit embodying a first shank portion having a curvate return bend at one end terminating in a barb, a second complemental offset portion terminating in a line accommodating eye and a median laterally bent offsetting portion constituting a journal and cooperatively uniting said first and second shank portions, an auxiliary fishhook unit complemental to said main unit and embodying a relatively short first shank portion having a similar curvate return bend at one end terminating in a companion barb, and a second shank portion having a line attaching eye and a coordinating intermediate portion having aligned coils operatively surrounding and supported by said journal, providing a bearing therefor, and pivotally mounting said auxiliary unit on said main unit, pull responsive spring means oriented with and normally retracting and nestling said barbs in set close-together weedless relationship, and a fishing line having one end tied on said second named eye and slidingly threaded through said first named eye and functioning when active to actuate the respective shank portions to a position spreading and opening and then coacting fish trapping barbs, said spring means being structurally designed and functionally adapted to simultaneously act on and position and maintain the shank portions of said auxiliary fishhook unit at right angles to the shank portions of the main fishhook unit when said main and auxiliary units are in their set readied-to-trap position and relationship, said barbs being disposed in close proximity and poised and retentively set at approximate right angles to each other.

2. The spring-loaded weedless fishhook defined in and according to claim 1, and wherein said spring means is constructed and retentively mounted so that the axes of the respective eye-equipped shank portions are normally positioned at right angles to each other but are capable of moving toward each other when the respective units are actuated into fish trapping and landing relationship.

3. A spring-loaded double-acting weedless type fishhook comprising a relatively long main fishhook unit embodying a first shank portion having a curvate return bend at one end terminating in a barb, a second complemental offset portion terminating in a line accommodating eye and a median laterally bent offsetting portion constituting a journal and cooperatively uniting said first and second shank portions, an auxiliary fishhook unit complemental to said main unit and embodying a relatively short first shank portion having a similar curvate return bend at one end terminating in a companion barb, and a second shank portion having a line attaching eye and coordinating intermediate portion having aligned coils operatively surrounding and supported by said journal, providing a bearing therefor, and pivotally mounting said auxiliary unit on said main unit, pull responsive spring means oriented with and normally retracting and nestling said barbs in set close-together weedless relationship, and a fishing line having one end tied on said second named eye and slidingly threaded through said first named eye and functioning when active to actuate the respective shank portions to a position spreading and opening the then coacting fish trapping barbs, said spring means being designed and cooperatively associated with said journal, bearing and the respective eye-equipped shank portions to normally spring and spread the respective second shank portions apart and simultaneously and yieldingly and forcibly pressing the barb-equipped shank portions together in weedless relationship.

4. The spring-loaded double-acting weedless fishhook defined in claim 3, and wherein the aforementioned intermediate coils are in a line with each other to offset the second shank portion of said auxiliary hook unit relative to the first shank portion thereof, and wherein said spring means comprises a substantially V-shaped spring embodying diverging legs terminating in eyes encircling and retentively joined to the respectively cooperable shank portions of said main and auxiliary fishhook units.

* * * * *